(12) United States Patent
Mojica

(10) Patent No.: US 12,553,804 B2
(45) Date of Patent: Feb. 17, 2026

(54) METHODS AND SYSTEMS FOR RECOVERING ASSESSABLE ANALYTES FROM CORE NEEDLE BIOPSIES

(71) Applicant: Virchow Medical, Inc., San Diego, CA (US)

(72) Inventor: Wilfrido Mojica, Williamsville, NY (US)

(73) Assignee: Virchow Medical, Inc., San Diego, CA (US)

( * ) Notice: Subject to any disclaimer, the term of this patent is extended or adjusted under 35 U.S.C. 154(b) by 0 days.

(21) Appl. No.: 18/468,416

(22) Filed: Sep. 15, 2023

(65) Prior Publication Data

US 2025/0093241 A1    Mar. 20, 2025

(51) Int. Cl.
*G01N 1/34* (2006.01)
*C12N 15/10* (2006.01)
*C12Q 1/6806* (2018.01)

(52) U.S. Cl.
CPC ........... *G01N 1/34* (2013.01); *C12N 15/1017* (2013.01); *C12Q 1/6806* (2013.01)

(58) Field of Classification Search
CPC .................................. G01N 1/30; G01N 1/34
See application file for complete search history.

(56) References Cited

U.S. PATENT DOCUMENTS

| | | | |
|---|---|---|---|
| 5,663,051 A | 9/1997 | Van Vlasselaer et al. | |
| 2012/0053484 A1 | 3/2012 | Parks | |
| 2012/0061392 A1 | 3/2012 | Beach et al. | |
| 2013/0095473 A1* | 4/2013 | Groelz | C12N 15/1003 435/40.52 |
| 2013/0295673 A1 | 11/2013 | Taghizadeh et al. | |
| 2015/0056614 A1 | 2/2015 | Mikolajczyk et al. | |
| 2021/0079328 A1 | 3/2021 | Barousse et al. | |

OTHER PUBLICATIONS

Mojica et al., Front-end genomics: using an alternative approach for the recovery of high-quality DNA from core needle biopsies, 70 J. Clinical Pathology 488 (Oct. 24, 2016).

(Continued)

*Primary Examiner* — Natalia Levkovich

(74) *Attorney, Agent, or Firm* — Spencer Fane, LLP

(57) ABSTRACT

Implementations include methods and systems for recovering an analyte from a tissue sample extracted via a core needle biopsy. The method may involve immersing the core needle holding the tissue sample in a sterilized buffer solution without formalin. Swirling of the needle may dislocate the tissue core and cells for creation of an intermediate mixture. This mixture may be filtered using a strainer into a sample tube to separate the tissue core resulting in another intermediate mixture. Equal volume of a cell lysis and stabilization reagent may be added to this mixture to yield a third mixture containing lysed dislodged cells. The assessable analyte, unexposed to formalin, may then be isolated. The system for this procedure may include a core needle, a buffer container, a sample tube, a strainer and a potential container for tissue core storage. The analyte could be DNA, RNA, an exosome, or a protein.

16 Claims, 15 Drawing Sheets

(56) References Cited

OTHER PUBLICATIONS

Mojica et al., Core needle biopsy wash as a tool for acquiring additional diagnostic material for laboratory testing, J. Clinical Pathology (Online) (Mar. 1, 2021), https://jcp.bmj.com/content/75/5/345.

Padmanabhan et al., Improving Adequacy of Small Biopsy and Fine-Needle Aspiration Specimens for Molecular Testing by Next-Generation Sequencing in Patients With Lung Cancer, 141 Arch Pathol Lab Med 402 (Mar. 1, 2017).

Arshad et al., Cellular Material from Core Needle Biopsy Washes are Molecularly Representative of the Corresponding Parent Tissue that is Formalin Fixed and Paraffin Embedded (Poster), 111th Annual USCAP (Mar. 19, 2022).

International Search Report and Written Opinion issued Jan. 13, 2025 in corresponding International Application No. PCT/US2024/046776.

\* cited by examiner

FIG. 8A                    FIG. 8B

METHODS AND SYSTEMS FOR RECOVERING ASSESSABLE ANALYTES FROM CORE NEEDLE BIOPSIES

BACKGROUND

Biopsies have been used for medical diagnostics for many years, serving as a method to extract and analyze samples of cells or tissues to better understand the nature and extent of a disease. A biopsy can assist in diagnosing a wide array of conditions such as cancers, where a tiny fragment of a suspicious growth or lesion is removed for microscopic examination. Through this scrutiny, pathologists may attempt to detect abnormalities, the presence of malignant cells, infections, or other pathological conditions.

The procedure to take a biopsy can vary based on the location and nature of the tissue or cells being sampled. Some biopsies, like those for the skin, are straightforward and may only utilize a needle or scalpel, and potentially local anesthesia. However, deeper tissues such as those within organs or bones might require more invasive techniques, including the use of imaging guidance like ultrasound, CT, or MRI.

Biopsies play a role in the medical decision-making process. While imaging and clinical assessments can provide insight into a patient's condition, the diagnosis can rely on the cellular and molecular details that only a biopsy can provide. It may aid in determining the presence of disease and can provide information on its stage, potential aggressiveness, and other characteristics crucial for tailoring an effective treatment strategy.

BRIEF DESCRIPTION OF THE FIGURES

For a fuller understanding of the nature and objects of the disclosure, reference should be made to the following detailed description taken in conjunction with the accompanying drawings, in which:

FIGS. 8A-8C are example cellularity images, respectively, of a tissue core, a magnified view of a tissue specimen processed according to one or more implementations herein, and a tissue specimen processed using conventional methods using formalin;

DETAILED DESCRIPTION

Figure 1A:
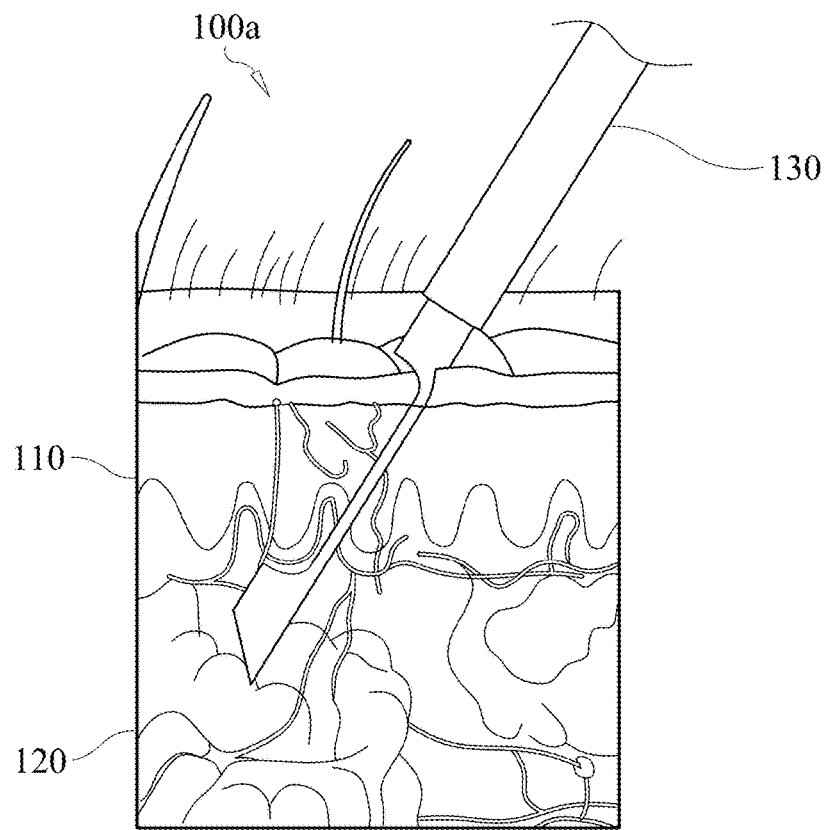
FIGS. 1A-1C illustrate a conventional method of performing a core needle biopsy (CNB) on a patient to analyze tissue received from a suspicious area, according to a conventional CNB method.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

A biopsy is a diagnostic procedure in which a sample of tissue is removed from the body and examined under a microscope to determine the presence, cause, or extent of a disease. Conventional biopsy techniques are used in diagnosing a variety of conditions, including cancer.

Conventional excisional and incisional biopsies can involve the surgical removal of tissue. In an excisional biopsy, the entire lump or suspicious area is removed, often with a margin of surrounding normal tissue. On the other hand, an incisional biopsy only removes a portion of the suspicious area. These techniques are useful for larger lumps or lesions that cannot be easily accessed with a needle. The removed tissue is then examined under a microscope by pathologists to determine its nature.

Another conventional technique includes endoscopic biopsies. Endoscopic biopsies are conducted using an endoscope, a flexible tube with a light and camera attached to its end. Tiny instruments can be passed through the endoscope to take tissue samples from areas of interest.

Another, less-invasive conventional technique is the needle biopsy, which uses a sharp, hollow needle to extract a core of tissue from the suspicious area. Depending on the size and location of the lesion, different types of needle biopsies may be used, such as fine-needle aspiration (FNA) and core needle biopsy (CNB). The former, FNA, uses a thin needle to withdraw cells or fluid, whereas the latter, CNB, uses a slightly larger needle to remove a 'core' of tissue. These methods can be guided by imaging techniques like ultrasound, CT scan, or MRI to ensure the correct placement of the needle and accurate sampling of the target tissue.

FNA is a diagnostic procedure that involves using a thin, hollow needle to extract cells or fluids from a lump or mass within the body for microscopic examination. This minimally invasive technique is conventionally used to investigate and diagnose various conditions, especially in the context of tumors or cysts.

During the FNA procedure, the clinician inserts a fine needle, often attached to a syringe, into the suspicious area. The needle's positioning can be guided by palpation, especially if the lump is just under the skin. For deeper or less palpable masses, imaging modalities like ultrasound, computerized tomography (CT) scan, or magnetic resonance imaging (MRI) can be used to ensure accurate needle placement.

Once the needle is in the desired position, a slight vacuum may be created using the syringe, helping to draw cells or fluid into the needle. The collected sample is then spread onto microscope slides and sent to a pathology lab. There, it may be stained and examined under a microscope by a pathologist to determine the nature of the cells, whether they're benign, malignant, inflammatory, or related to other conditions.

A shortcoming of FNA is that the small sample size can sometimes limit the pathologist's ability to make a definitive diagnosis. The procedure might not always retrieve an adequate number of cells, leading to inconclusive or indeterminate results. This limitation often necessitates repeat procedures or alternative tests, making it less efficient in certain cases. Additionally, while FNA can identify malignancy, it might fall short in determining the specific type or subtype of cancer, a critical aspect for tailored treatments. As a result, if the findings from the FNA are inconclusive or contradictory to other clinical evidence, a more extensive biopsy method might become needed for further evaluation.

Furthermore, the accuracy of FNA depends significantly on the skill of the operator. Inexperienced operators might increase the risk of inconclusive or inaccurate results. There's also a minimal but present risk of complications like bleeding, infection, or unintentional injury to nearby structures, especially when aspirating from deeply seated organs. Another concern with FNA is the theoretical risk that the procedure might inadvertently spread cancerous cells due to the need to aspirate the target cells. Additionally, FNA only provides cellular samples, unlike biopsies that offer larger tissue samples. This distinction means FNA can't assess the architectural organization of the tissue, which is essential for some diagnoses. Furthermore, FNA is purely diagnostic, lacking therapeutic benefits like draining or lesion removal. As a result, while FNA is a valuable tool, its limitations require careful consideration by medical professionals.

A conventional alternative to FNA is to perform a core needle biopsy (CNB). CNB is a medical procedure used to extract a small sample of tissue from a suspicious area within the body, often from masses or lumps that a medical provider suspects might be cancerous.

Figure 1B:
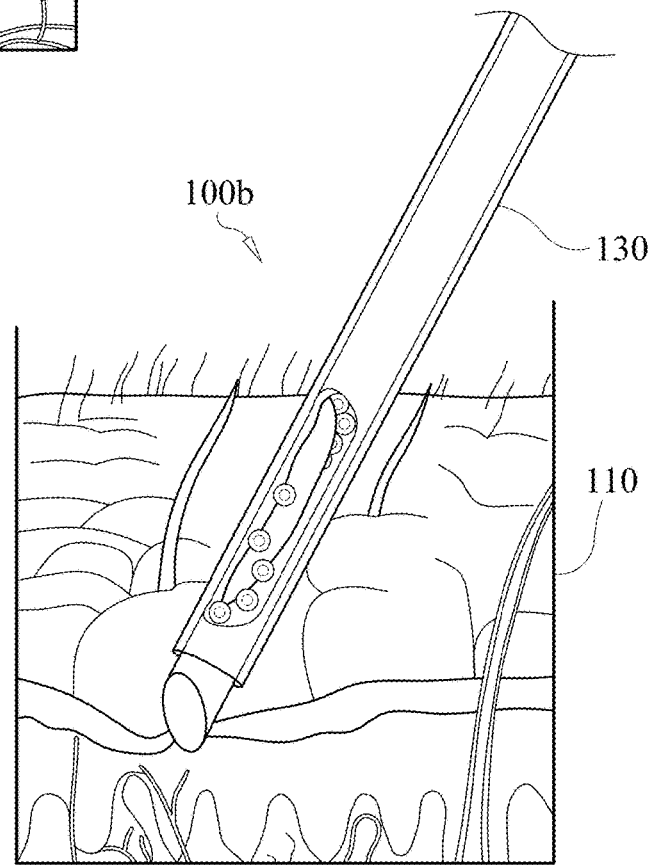
Figure 1C:
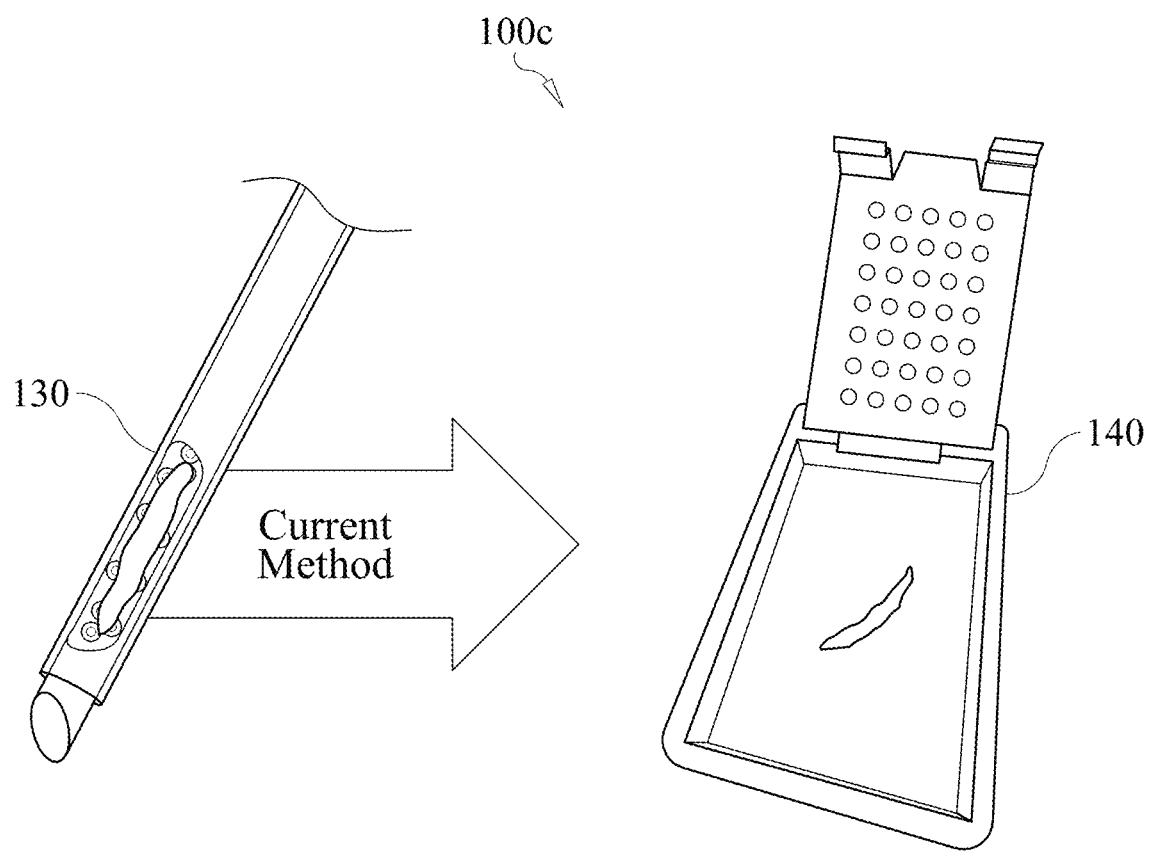

FIGS. 1A-1C illustrate a conventional method of performing a CNB on a patient 110 to analyze tissue received from a suspicious area 120, according to a conventional CNB method.

To perform a CNB, at 100a, a clinician may use a hollow needle 130 to retrieve a slender (e.g., cylindrical or other shape) sample—a tissue core—of tissue from suspicious area 120. The procedure can involve the use of imaging guidance, such as ultrasound, mammography, or MRI, to help position the needle precisely. After numbing the area with a local anesthetic, the doctor may insert hollow needle 130 through the skin and into suspicious area 120. At 100b, hollow needle 130 may be extracted from patient 110 with the tissue sample disposed therein. Then, at 100c, the tissue sample may be extracted from needle 130 and placed in a cassette 140 for processing. Once the tissue sample is obtained and fixed in cassette 140, it may then be sent to a pathology laboratory for examination under a microscope.

Once the sample reaches the pathology laboratory, a pathologist may examine it to determine the nature of the cells and the type of disease present, if any. The results can typically be expected within a few days to a week, depending on the complexity of the case and the specific protocols of the medical facility.

One of the main advantages of a CNB is that it is less invasive than surgical biopsies, which often require larger incisions and a longer recovery time. This biopsy method offers quicker recovery, less scarring, and is generally safer than surgical alternatives. However, there are also limitations to core needle biopsies, including a possibility that the needle might not capture the tissue that best represents the entire abnormality. Consequently, the results might be inconclusive or not entirely accurate, potentially leading to a need for further testing or a surgical biopsy.

While conventional-technique CNBs may be valuable for diagnosing many conditions, they may not provide sufficient tissue for certain molecular or genetic tests that could be usable in modern targeted therapies. One of the reasons for this shortcoming is the conventional way tissue derived from a CNB is preserved.

Tissue samples derived using CNBs are conventionally preserved in a formalin (e.g., formaldehyde-containing) solution. Formalin may be used as a fixative for the preservation of tissue samples derived from CNBs, acting by creating cross-links between proteins, which stabilizes cellular structures and preserves the morphological and cellular details of the tissue. When a CNB is performed, the tissue sample is conventionally promptly immersed in formalin to prevent autolysis and degradation of the cellular components. The preserved tissue can then be processed, embedded in paraffin, and sectioned for microscopic examination, for example, using hematoxylin and eosin staining. The use of formalin is conventionally justified as ensuring that the histopathological features of the tissue core are maintained, allowing for accurate diagnostic interpretation by pathologists.

However, the conventional use of formalin in the preservation of tissue samples is also the cause of one of the shortcomings of conventional-technique CNBs, since that it easily damages certain analytes, such as nucleic acids. Thus, any remaining analyte which could be derived from a tissue sample may not be usable for provision of reliable diagnostic or molecular testing data due to its exposure to formalin.

Beyond the tissue core taken during the biopsy, additional diagnostic material, in the form of dislodged cells, can be released from the tissue. Because these dislodged cells cannot be seen by the naked eye, they are routinely discarded, either attached to the needle itself, or to a gauze pad the physician places the visible piece of tissue on.

Implementations herein enable the preservation of both the tissue core and the dislodged cells are separated from the needle by swirling them in a buffered solution. Then, the solution may be filtered to separate the tissue core from the dislodged cells. The tissue core, which can be seen, may then be separated (e.g., extracted) and placed into a container such as a cassette for routine processing. A reagent may be added to the dislodged cells to lyse them and stabilize their nucleic acids.

Implementations pertain to methods and systems for efficiently and effectively recovering assessable analytes, potentially including but not limited to DNA, RNA, exosomes, or proteins, from a tissue sample obtained by CNB. This process may include providing a core needle embedded with a tissue sample, immersing the needle in a buffer solution, such as a sterilized phosphate buffered saline solution, and swirling to dislodge the tissue and cells, thereby forming an intermediate mixture. This mixture may be filtered using a designated strainer into a sample tube, serving to separate the tissue core and generate a second intermediate mixture of dislodged cells within the buffer solution.

A volume of a cell lysis and nucleic acid stabilization reagent, for example, equal in volume to the volume of the second intermediate mixture, may be combined with the second intermediate mixture, resulting in cell lysis and the creation of a third mixture. The analyte can subsequently be extracted from this mixture. Different from conventional-technique CNB and sample preparation, implementations operate without exposure of the analyte to formalin. The method may be facilitated by a system comprising a core needle, as well as a container for the buffer solution, a sample tube, a strainer, and a receptacle for the removed tissue core, all or some of which may be presented as a kit. The method may also optionally involve tube centrifugation (i.e., spinning) for mixture separation to facilitate removal of the supernatant from the sample tube, and storage of the sample tube in temperatures near 4 degrees C., alleviating the need for deep-freezing the analyte.

Implementations may thus enable recovery of the dislodged cells for analysis of an analyte contained therein (e.g., DNA, RNA, exosomes, proteins), without having been exposed to formalin.

Implementations may provide for simpler CNB and sample preparation procedures, lowering the skill requirement and the effects of variance thereof, and may reduce the time needed to provide the sample to a laboratory for diagnostics or molecular study (e.g., nucleic acid sequencing).

Creating two specimens from one means there is a reduced chance of exhausting the parent tissue, thus allowing the pathologist to abide by regulatory and credentialing agencies, and provide for improved patient experience.

Shortened pre-analytics additionally reduces a risk that false negative or false positive changes will be encountered from the specimen. The pre-analytics in proof-of-principle studies by the inventor was kept to 15 minutes. Although regulations are inconsistent or unavailable on pre-analytics for most types of specimens—using conventional methods, molecular breakdowns and other issues can start as early as 1 hour.

Figure 2:
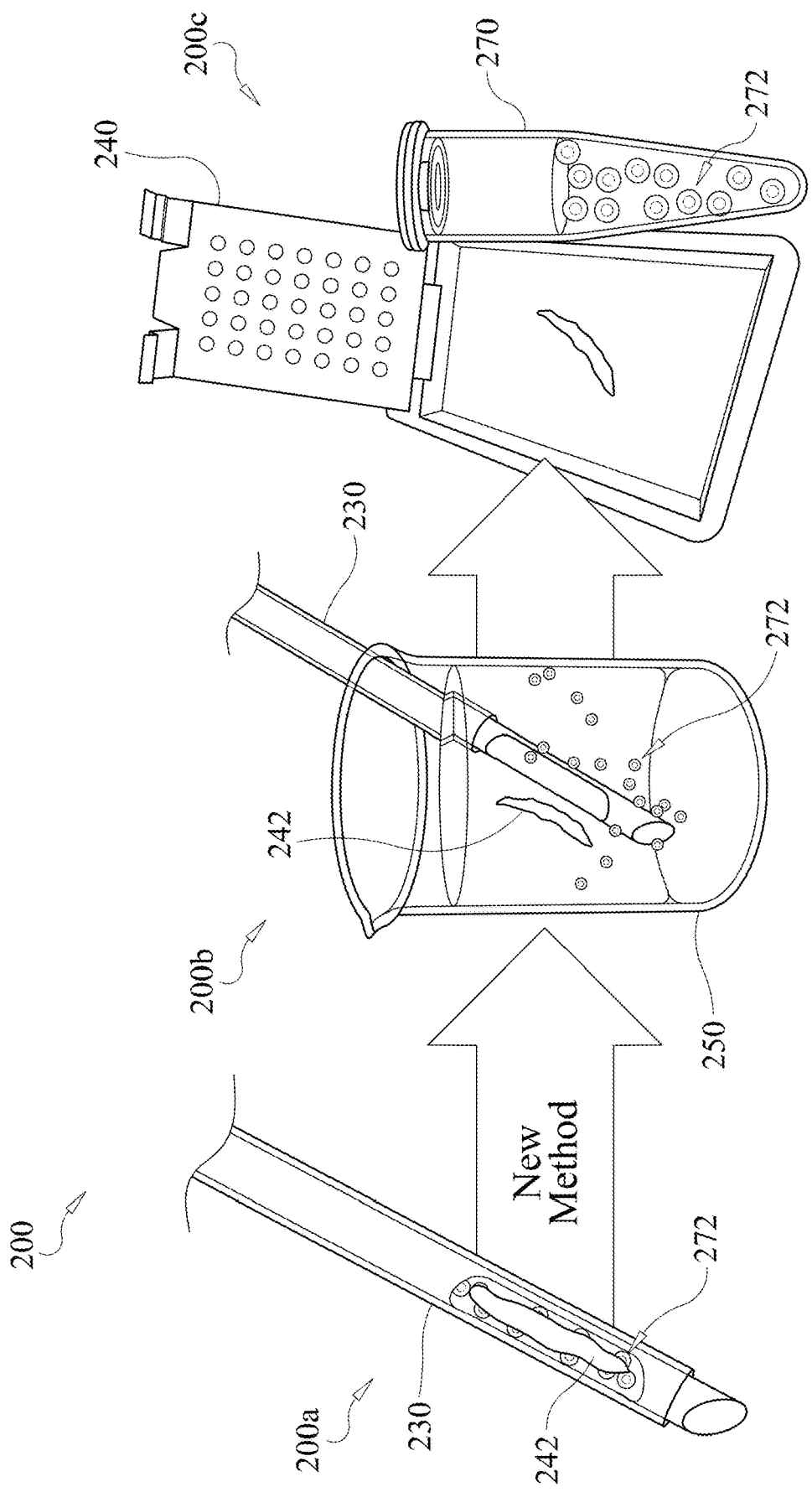
FIG. 2 illustrates a procedure for recovering an assessable analyte from a tissue sample retrieved via a CNB without exposing the assessable analyte to formalin, according to one or more implementations herein.

FIG. 2 illustrates a procedure 200 for recovering an assessable analyte from a tissue sample retrieved via a CNB without exposing the assessable analyte to formalin, according to one or more implementations herein. The assessable analyte may be, for example, DNA, RNA, an exosome, or a protein.

At 200a, a core needle 230 having the tissue sample disposed therein retrieved via the CNB may be provided. The tissue sample may include both a tissue core 242 and dislodged cells 272.

At 200b, a portion of core needle 230 having the tissue sample disposed therein may be immersed in a buffer solution in a container 250, and swirled until the tissue core 242 and the dislodged cells 272 dislodge from core needle to form a first intermediate mixture in container 250 comprising the buffer solution, the tissue core 242, and the dislodged cells. The buffer solution may comprise a phosphate buffered saline solution. The buffer solution may be sterilized prior to immersing the core needle 230 therein.

The first intermediate mixture in container 250 may be filtered using a strainer into a sample tube 270 (e.g., a container) to separate the tissue core 242 from the first intermediate mixture, yielding the tissue core 242—which may be disposed within a container such as cassette 240 at 200c, and a second intermediate mixture comprising the buffer solution and the dislodged cells 272. The strainer may be disposed at least partially in sample tube 270.

A cell lysis and stabilization reagent may be added to the second intermediate mixture in sample tube 270 to yield a third mixture comprising lysed dislodged cells 272 from which the assessable analyte can be retrieved. The cell lysis and stabilization reagent may be equal in volume to the second intermediate mixture. In some implementations, the cell lysis and stabilization reagent may comprise from 2 mL to 5 mL of the cell lysis and stabilization reagent. The cell lysis and stabilization reagent may be a concentrated, dual action cell lysis and nucleic acid stabilization reagent.

The assessable analyte may then be isolated from the third mixture contained in sample tube 270, and analysis may be performed using the assessable analyte (e.g., DNA/RNA/protein/gene analysis).

Sample tube 270 having the third mixture disposed therein may be stored within a freezer, for example, at an internal temperature of 4 deg C. Thus, the need for storage in a deep freezer is obviated by implementations herein.

Figure 3:
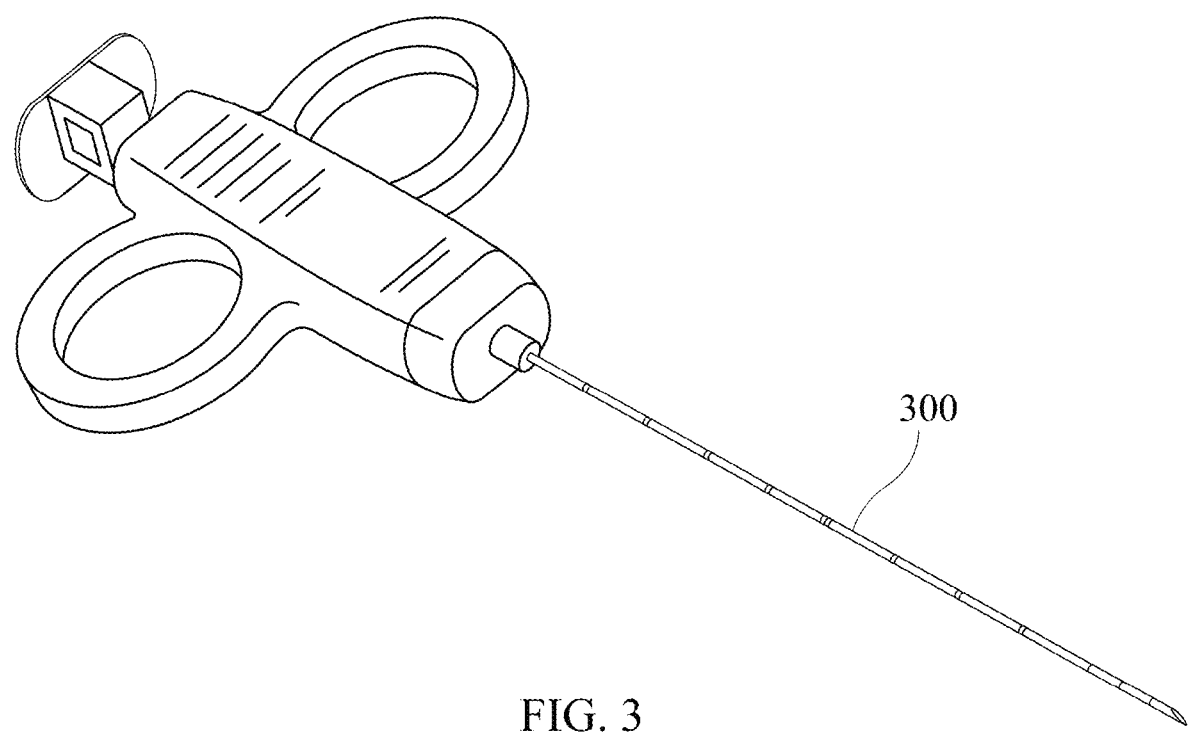
FIG. 3 illustrates a core needle biopsy device, according to one or more implementations herein.

FIG. 3 illustrates a core needle biopsy device 300, according to one or more implementations herein. Core needle biopsy device 300 may include a core needle, handle, sheath, and components necessary for covering the core needle with the sheath and be configured for performance of a CNB on a patient and/or specified for a particular CNB to be performed.

Figure 4A:
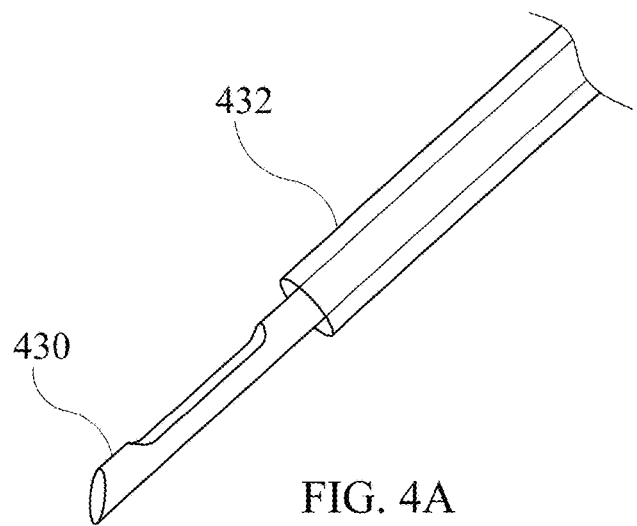
FIGS. 4A-4C illustrate a collection of a tissue sample comprising a tissue core and dislodged cells, according to one or more implementations herein.
Figure 4B:
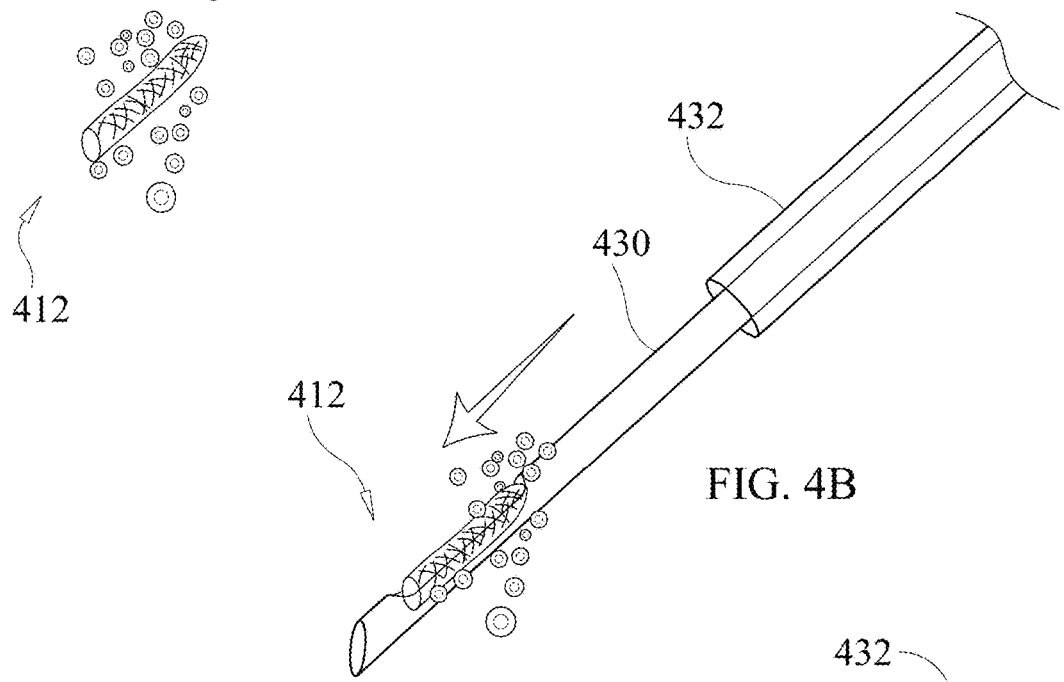
Figure 4C:
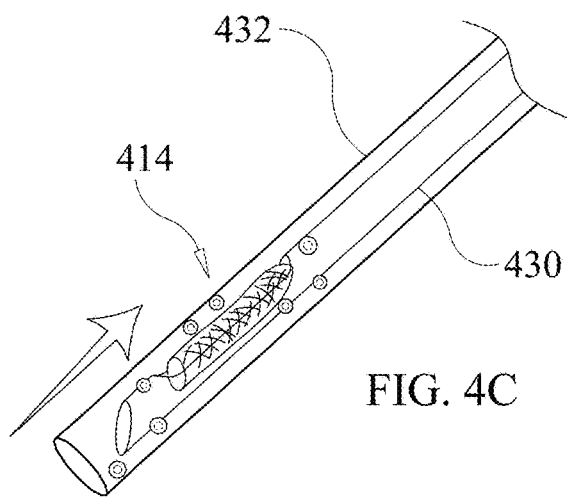

FIGS. 4A-4C illustrate a collection of a tissue sample 414 comprising a tissue core and dislodged cells, according to one or more implementations herein. Particularly, FIGS. 4A-4C illustrates the capture of the dislodged cells in addition to the tissue core in a target tissue area 412 using a core needle 430 and retracting core needle 430 into a core needle sheath 432, and may be similar to the capture of the tissue specimen at 200a. The basis for the collection of dislodged cells in the CNB may occur when core needle sheath 432 is released and covers the biopsy needle. A tissue sample 414 comprising the tissue core and dislodged cells (e.g., dislodged tumor cells) remain in the space between core needle 430 and core needle sheath 432.

Since individual cells and small groups of cells cannot be visualized by the human eye, they are conventionally not accounted for when transferring the specimen for processing. However, according to implementations herein, disposing the core needle 430 and core needle sheath 432 in a buffer solution may create a liquid biopsy specimen, from which the tissue can be separated and sent for traditional processing and the dislodged cells kept and retained for later use. Further processing of implementations herein of filtering, followed by lysing and stabilization herein provides for long-term, economical storage of the dislodged cells.

Figure 5:
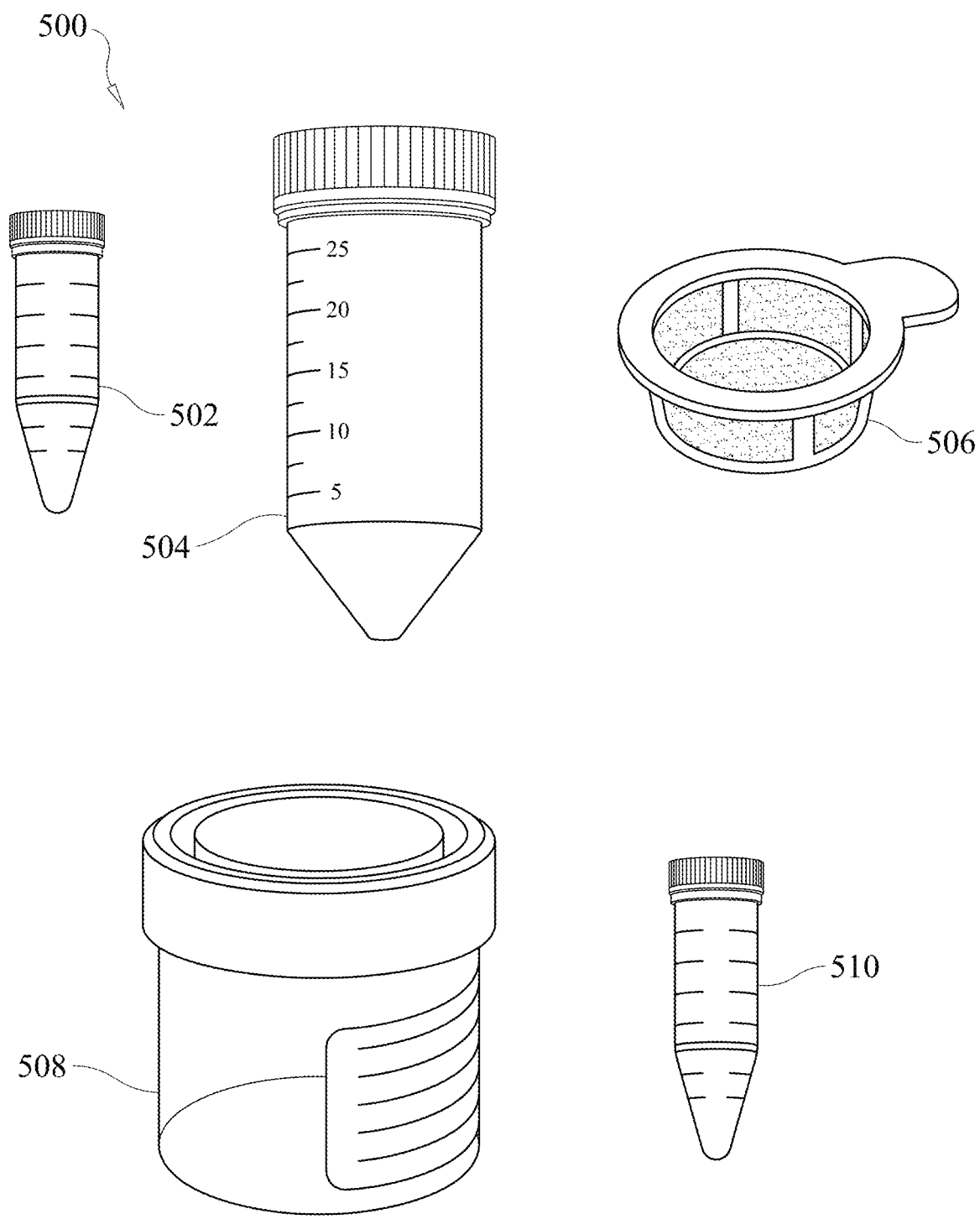
FIG. 5 illustrates a system for recovering an assessable analyte from a tissue sample retrieved via a core needle biopsy without exposing the assessable analyte to formalin, according to one or more implementations herein.

FIG. 5 illustrates a system 500 for recovering an assessable analyte from a tissue sample retrieved via a core needle biopsy without exposing the assessable analyte to formalin, according to one or more implementations herein. All or part of system 500 may be provided as a kit. The assessable analyte may be, for example, DNA, RNA, an exosome, or a protein.

System 500 may include a core needle (e.g., a core needle of core needle biopsy device 300), which may be configured to collect a tissue sample therein retrieved via the core needle biopsy, wherein the tissue sample comprises a tissue core and dislodged cells.

System 500 may include a buffer container 502 configured to contain a buffer solution and receive the core needle having the tissue sample disposed therein such that a portion of the core needle having the tissue sample disposed therein may be immersed in the buffer solution and swirled until the tissue core and the dislodged cells dislodge from the core needle to form a first intermediate mixture within the buffer container comprising the buffer solution, the tissue core, and the dislodged cells.

System 500 may include a sample tube 504. The sample tube may be further configured for adding an equal volume to the second intermediate mixture of a cell lysis and stabilization reagent to the second intermediate mixture yielding a third mixture comprising lysed dislodged cells from which the assessable analyte can be retrieved from.

System 500 may include a strainer 506 (e.g., a 40 μm to 100 μm strainer) configured to be disposed at least partially within sample tube 504 such that the first intermediate mixture may be filtered into sample tube 504 using strainer 506 to separate the tissue core from the first intermediate mixture, yielding the tissue core and a second intermediate mixture comprising the buffer solution and the dislodged cells.

System 500 may include a container 508 configured for storage of the tissue core.

System 500 may include a container 510 for provision of the cell lysis and stabilization reagent.

Figure 6:
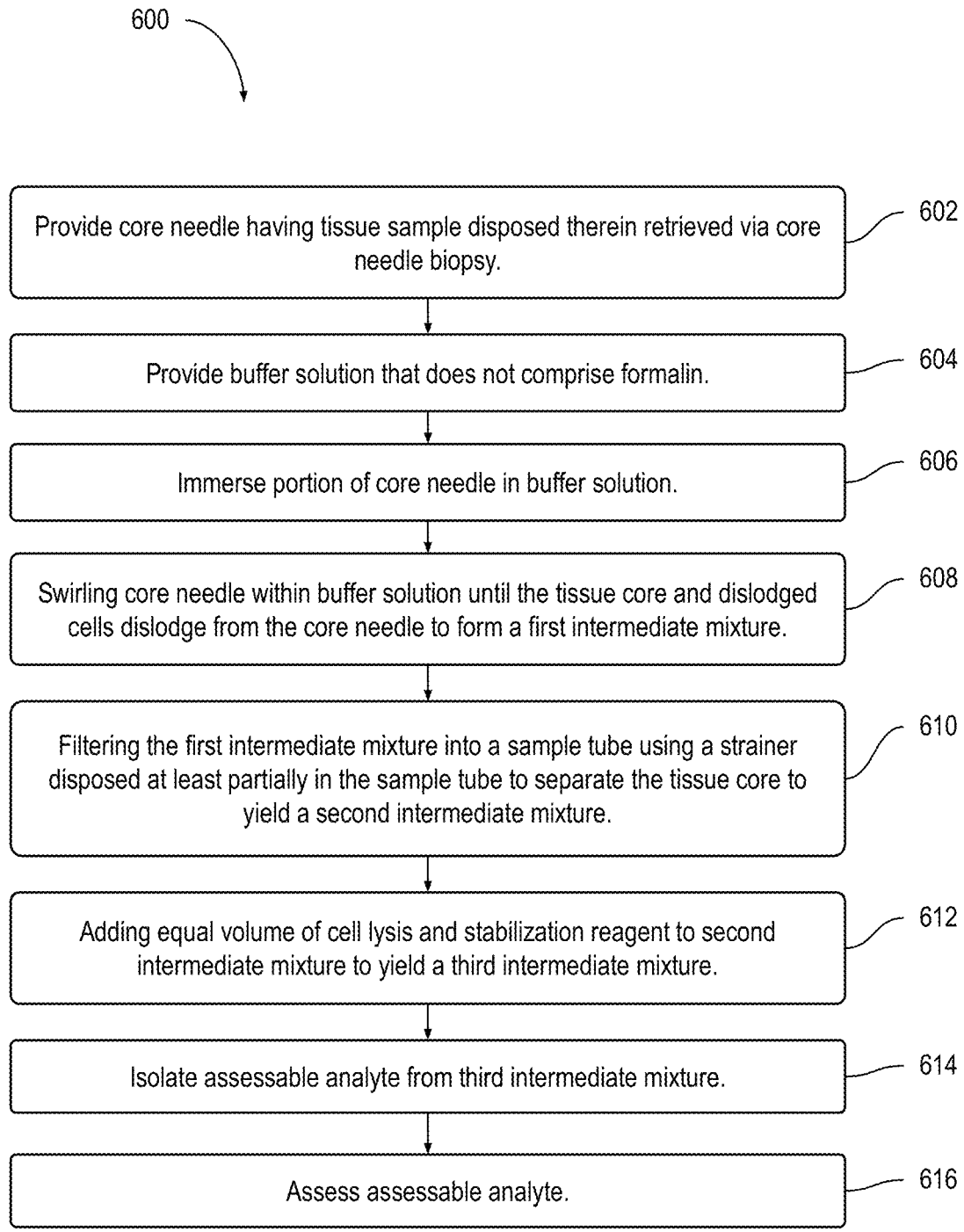
FIG. 6 is a flowchart illustrating an example method for recovering an assessable analyte from a tissue sample retrieved via a core needle biopsy, according to one or more implementations herein.

FIG. 6 is a flowchart illustrating an example method 600 for recovering an assessable analyte from a tissue sample retrieved via a core needle biopsy, according to one or more implementations herein. In some implementations, one or more process blocks of FIG. 6 may be performed by components similar to one or more of the devices or components of FIGS. 3-5, or other components or devices. The assessable analyte may be, for example, DNA, RNA, an exosome, or a protein.

An operation 602 may include providing a core needle having the tissue sample disposed therein retrieved via the core needle biopsy, and may be performed alone or in combination with one or more other operations depicted in FIG. 6. The tissue sample may comprise a tissue core and dislodged cells.

An operation 604 may include providing a buffer solution, and may be performed alone or in combination with one or more other operations depicted in FIG. 6. The buffer solution may be sterilized and not comprise formalin.

An operation 606 may include immersing a portion of the core needle having the tissue sample disposed therein in the buffer solution, and may be performed alone or in combination with one or more other operations depicted in FIG. 6.

An operation 608 may include swirling the core needle within the buffer solution until the tissue core and the dislodged cells dislodge from the core needle to form a first intermediate mixture comprising the buffer solution, the tissue core, and the dislodged cells, and may be performed alone or in combination with one or more other operations depicted in FIG. 6.

An operation 610 may include filtering the first intermediate mixture into a sample tube using a strainer disposed at least partially in the sample tube to separate the tissue core from the first intermediate mixture, yielding the tissue core and a second intermediate mixture comprising the buffer solution and the dislodged cells, and may be performed alone or in combination with one or more other operations depicted in FIG. 6. The tissue core may be extracted and disposed within a container configured for conventional tissue processing of the tissue core.

An operation 612 may include adding an equal volume, to the second intermediate mixture, of a cell lysis and stabilization reagent to the second intermediate mixture yielding a third mixture comprising lysed dislodged cells from which the assessable analyte not exposed to formalin can be retrieved, and may be performed alone or in combination with one or more other operations depicted in FIG. 6. The cell lysis and stabilization reagent may be a concentrated, dual action cell lysis and nucleic acid stabilization reagent.

An operation 614 may include isolating the assessable analyte not exposed to formalin from the third mixture, and may be performed alone or in combination with one or more other operations depicted in FIG. 6.

An operation 616 may include assessing the assessable analyte not exposed to formalin, and may be performed alone or in combination with one or more other operations depicted in FIG. 6.

Although FIG. 6 depicts example method 600, respectively, and operations thereof, in some implementations, a method illustrated herein may include additional operations, fewer operations, differently arranged operations, or different operations than the operations depicted in FIG. 6. Moreover, or in the alternative, two or more of the operations depicted in FIG. 6 may be performed at least partially in parallel.

EXPERIMENTATION

Methodology

At the time of the procedure, an interventional radiologist was given a container with phosphate buffered saline (PBS) for each of five cases. For the first three cases, the interventional radiologist made one to two passes to obtain tissue, and then transferred them into an empty container by scraping off the tissue with a scalpel blade on to a saline soaked gauze pad that was then filled with formalin. For the final pass, the tissue in the needle was immersed in the container with PBS and gently agitated, so as to separate both the tissue and any dislodged cells from the needle that may have been loosened by the procedure.

By placing and agitating the tip of the needle after a procedure into a container with fluid, both the targeted tissue and the unseen cells could be recovered and separately processed for their disparate needs, as illustrated in FIG. 2. In the first three cases of this experimentation, the wash step was done as the last pass performed by the interventional radiologist so as not to introduce a possibly contaminated needle re-entering the patient. For the final two cases, the PBS solution and container were sterilized prior to the procedure. This allowed the interventional radiologist to release the tissue and any dislodged cells from all the passes into the PBS solution.

The initial approach in the first three cases inadvertently permitted testing as to whether the washed tissue specimen—processed slightly different from the initial passes, and therefore may have incurred some pre-analytical changes—resulted in any downstream differences in evaluation, such as, for example morphologic and immunohistochemically, from the unwashed tissue that was processed in a conventional manner.

Antibodies to proteins known to be expressed on the cell membrane, the cytoplasm, and nucleus in the tumor sample biopsies as part of the first three cases were evaluated to ascertain if the pre-processing wash step altered protein expression compared to the traditional, unwashed approach.

Once the last pass was completed, formalin was added to the container containing the unwashed tissue. All tissue cores—washed and unwashed—were placed in separate cassettes for subsequent embedding and sectioning.

The washed specimen—the specimen deposited in PBS in the interventional radiology suite—was filtered through a disposable, 100 µm sieve strainer. The tissue core that was recovered in the sieve was then placed into a cassette, placed in formalin and processed using formalin-fixed paraffin-embedded (FFPE) procedures. The filtered solution was transferred to a microcentrifuge tube and spun down until all the fluid was processed. At this point 500 µl of the lysis and preservative reagent was added to the microcentrifuge tube and pipetted repeatedly so as to lyse the cells. This mixture of only dislodged cells from the parent tissue and of no tissue fragments, was then placed in a −20 deg C. freezer and kept there until all cases in this study cohort were collected. Time stamps were recorded as to the acquisition of the tissue from the interventional radiologist, time to transport to the lab, and time at which point the preservative reagent was added to the pelleted dislodged cells and were compiled as the time before stabilization (TABLE 1).

The parent core tissue was examined by bright field examination and evaluated for cellularity, with consideration given to whether there were areas of normal tissue and/or necrosis present in the specimen to determine impact on nucleic acid recovery.

Once all of the cases had been collected, DNA was extracted. Quantification was done in duplicate, and obtained using a fluorometer and a spectrophotometer. The latter was used to obtain an A260/280 absorbance ratio for assessment of DNA purity. Amounts of recovered DNA were calculated from the given concentration from the fluorometer multiplied by the eluted volume. Qualitative metrics were derived from a fragment analyzer and included both specimen size and the Genomic Quality Number (GQN). The latter was obtained at a threshold of 500 base pairs, a size previously used as the standard for assessment of DNA from FFPE tissue blocks. A score of 10 is optimal while 1 is considered highly degraded. The DNA from each case was then subjected to library preparation. An input of 200 ng of sample up to a volume of 30 microliters was used for each sample.

Sequencing of each sample was performed and quality metrics of the sequencing run for each case was evaluated. In particular, evaluation of the Phred score, a measure of the quality of the identification of nucleotides generated during automated DNA sequencing, and the percentage of nucleotides that could not be identified (per base N content), were assessed. For a Phred score, values can range from 4 to 60, with a score of 20 corresponding to a 99% probability that the base call is correct, a score of 30 equivalent to an accuracy of 99.9%, and a score of 40 corresponding to a 99.99% rate of accuracy. For the Phred scores, the scores from each sample at each nucleotide were taken and a plot generated with scores in the lower quartile (Q1), the middle quartiles (Q2-Q3), and upper quartile (Q4). Average quality scores typically demonstrate a steady drop over the length of the read. The "per base N content" analysis reflects the percentage that a particular base was ambiguous and could not be given a designation of being an A, T, C or G

TABLE 1

Tumor type, cellularity, and nucleic acid quantitative and qualitative metrics associated with each specimen.

| Case # | Diagnosis | Biopsy site | Total number of passes | Number of passes washed/tissue core length (cm) | Number of tissue cores not washed | Cellularity |
|---|---|---|---|---|---|---|
| 1 | Small cell carcinoma | Liver | 3 | 1/1.3 | 2 | moderate |
| 2 | Normal liver | Liver | 3 | 1/0.5 | 2 | moderate |
| 3 | Cholangio-carcinoma | Liver | 3 | 1/0.7 | 2 | moderate |
| 4 | Prostatic adenocarcinoma | Patella | 3 | 3/4.6 | N/A | high |
| 5 | Cirrhosis | Liver | 5 | 5/4.0 | N/A | moderate |

| Case # | Time before stabilization (minutes) | A260/280 | Average size of recovered DNA (bp) | Recovered DNA (ng) Quibit/Nanodrop | Genomic Quality Number |
|---|---|---|---|---|---|
| 1 | 15 | 1.76 | 23,351 | 1600/1325 | 10 |
| 2 | 14 | 1.67 | 28,330 | 151/550 | 10 |
| 3 | 16 | 1.63 | 19,694 | 395/445 | 9.9 |
| 4 | 55 | 1.81 | 18,806 | 2605/1745 | 9.9 |
| 5 | 15 | 1.88 | 24,581 | 102/540 | 9.9 | nucleotide. In this metric, a very low proportion of N's appearing in the sequence is not to be unexpected, specifically near the end of the sequence.

However, concerns about quality arise when the proportion of N's rise above a few percentage points. These variables were examined as an indirect assessment of the originating DNA, following the principle that poor originating template quality is the most common cause of any subsequent, problematic sequencing result.

Results

The time from tissue specimen procurement in the interventional radiology suite, transport to the pathology laboratory, separation of the dislodged daughter cells from the parent tissue core, and stabilization of the former in the DNA/RNA preservative reagent was under twenty minutes for four of the five cases (TABLE 1).

For the outlier, the pre-analytical time frame was still under sixty minutes and was due to transport related issues. This delay however, did not result in an appreciable difference in the evaluated qualitative metrics. The effort in processing the specimen required less than five minutes of hands-on time, and could be done by one individual.

Four of the five biopsied sites came from the liver, with the fifth coming from bone. The diagnosis for each case is given in TABLE 1. The tissue core that was washed in PBS as previously described was then placed in formalin, and along with the other tissue cores that were not washed, underwent FFPE processing to generate tissue blocks. The length of the single tissue core that was washed ranged from 0.5 to 1.3 cms (cases 1 to 3), and for cases 4 and 5, in which all the tissue from all the passes was washed, 4.0 and 4.6 cm in aggregate (TABLE 1). Upon examination, no notable discrepancies could be identified between the tissue specimens at the morphologic level, in terms of both architecture and cytology when stained by hematoxylin and eosin, between those tissue cores that had been washed and those that had not (FIGS. 7A-11B). The cellularity between the washed cores and the unwashed cores were similar as well, with no noticeable diminution in cellularity. The problem of core cell depletion that is associated with aggressive touch preparation was not noted in this study, probably because gentle agitation of the tissue core was sufficient to recover any loose cells, but not sufficient to cause significant depletion of the core's cellularity. The cellularity in each specimen was considered to be either moderate or highly cellular (TABLE 1). Immunohistochemistry for proteins present at the cell membrane (e.g., CD-56), the cytoplasm (e.g., PSA), and the nucleus (e.g., NKX3.1) showed no appreciable differences in intensity (FIGS. 12A-12F). Variability in staining within the tumor tissue was noted in both matched tissue cores.

Figure 13:
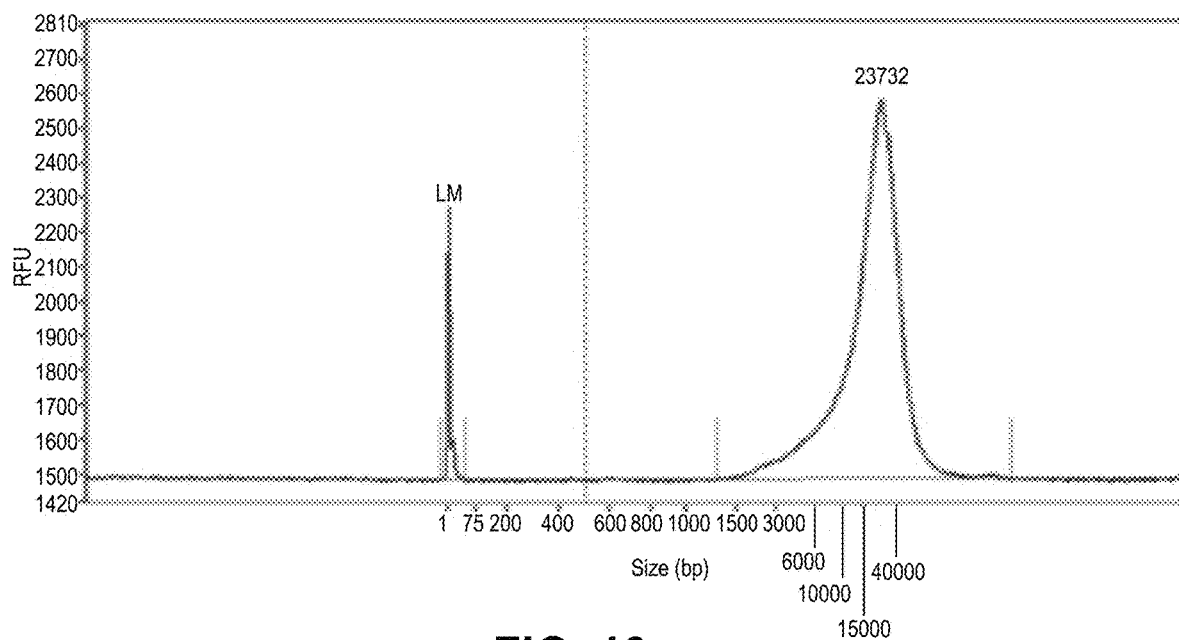
FIG. 13 illustrates pre-sequencing evaluative electropherogram assessment for degradation of the extracted DNA from a representative sample of washed/recovered dislodged cells demonstrating a bell shaped curve with minimal evidence of degradation, according to one or more implementations herein.
Figure 14:
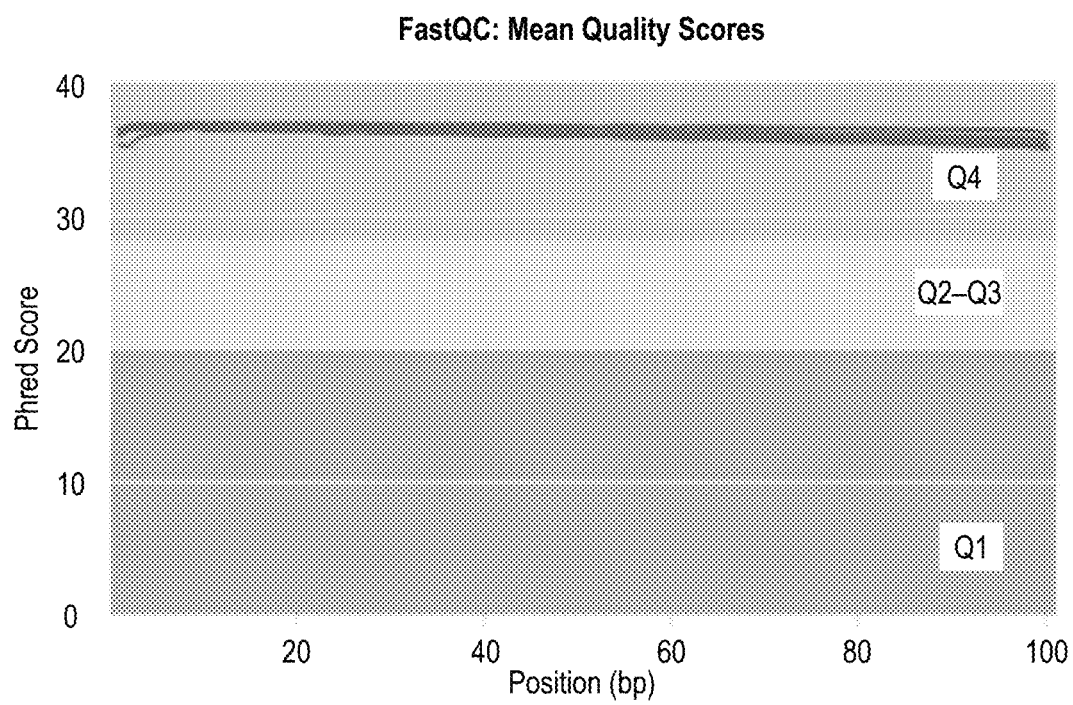
FIG. 14 illustrates post-sequencing qualitative data from all the washed specimens when assessed for Phred score, according to one or more implementations herein.
Figure 15:
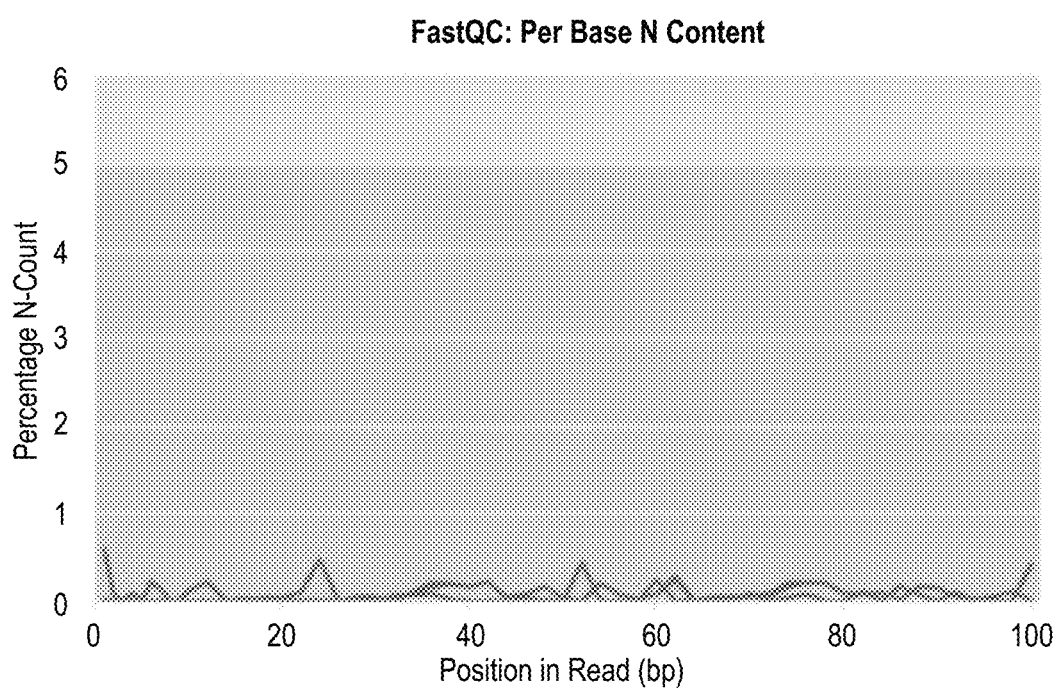
FIG. 15 illustrates post-sequencing qualitative data from all the washed specimens when assessed for per-base N content, according to one or more implementations herein.

Nuclear material from the dislodged cells for the tissue core and corresponding needle was recovered from each case. No cell pellet was identified in any of the supernatant washes from any of the specimens. These two observations indicate that cellular material is present in the supernatant wash, but too few to form a visible pellet. This held true for even cases 4 and 5, when all the tissue from the passes were included in one wash container. The amount of DNA present in the supernatant was variable, with the fewest amount in the non-neoplastic liver tissue (cases 2 and 5), and higher in the neoplastic tissue (TABLE 1). This is consistent with previous observations that in normal tissue there are fewer dislodged cells as a by-product of the procedure. The limited time frame and the unknown underlying diagnosis in each case prevented the investigators from selecting only biopsied tumor tissue to test. The largest amount of recovered DNA was from a neoplasm in which the tissue from all the passes had been washed (case 4). The purity of the DNA, as assessed by the A260/280 was above 1.8 in only two of the five cases, indicative of some possible residual contaminants in three of the specimens. No further purification was performed prior to generating the libraries as the GQN was at or close to 10 in each case. The range in the size of the extracted DNA was between 15,000 to a little under 24,000 base pairs (FIG. 13). Typical features of fragmentation, as in the presence of smearing at the lower end of each electropherogram, were not present or minimal in all of the cases. No effort was made to recover higher molecular weight DNA (>50 kbp), as the recovered DNA was fit for purpose (e.g., the sequencing platform used works with short reads). Enough DNA was recovered for sequencing using a sequencer having input requirements of 200 ng of total DNA. The resulting sequencing metrics were indicative of high confidence data, with Phred scores consistently at or above 35 and no dipping at the tail end of the read (FIG. 14). Additionally, per base N content never reached a level of 1% in any of the reads of any of the samples (FIG. 15).

Figure 7A:
FIGS. 7A-7C are example cellularity images, respectively, of a tissue core, a magnified view of a tissue specimen processed according to one or more implementations herein, and a tissue specimen processed using conventional methods using formalin.
Figure 7B:
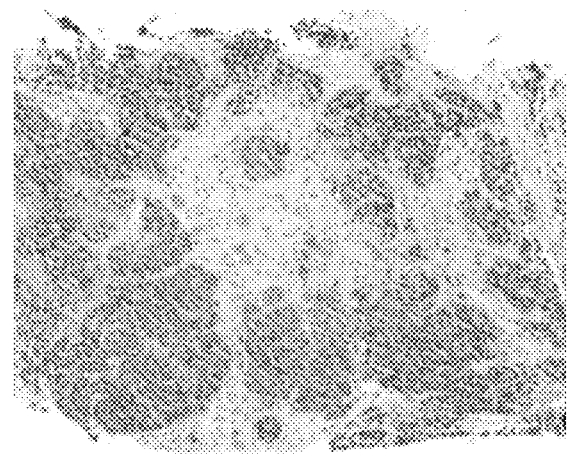
Figure 7C:
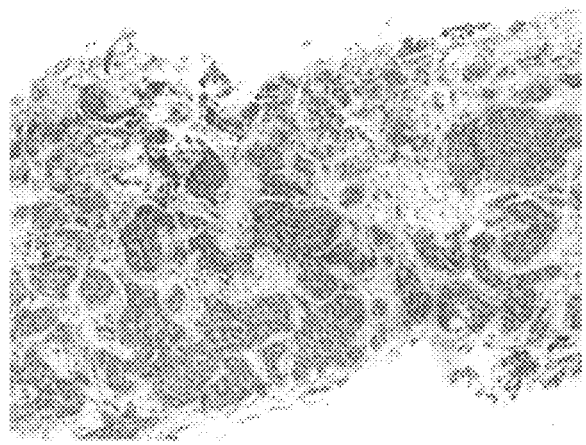

FIGS. 7A-7C are example cellularity images, respectively, of a tissue core, a magnified view of a tissue specimen processed according to one or more implementations herein, and a tissue specimen processed using conventional methods using formalin.

Figure 8C:
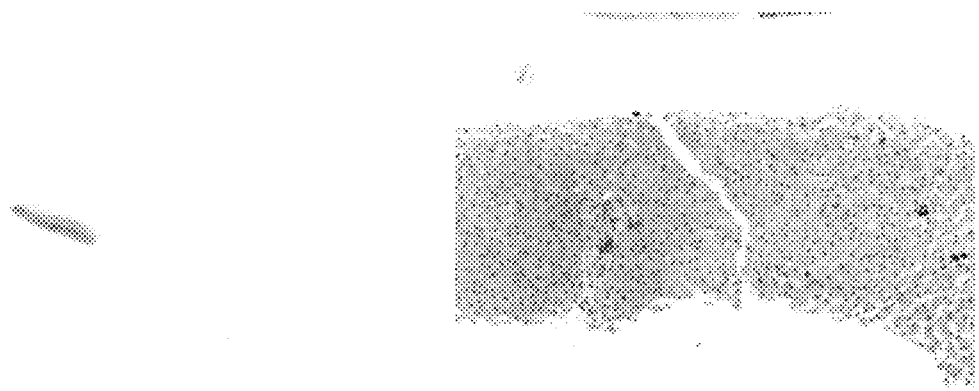
Figure 8C:
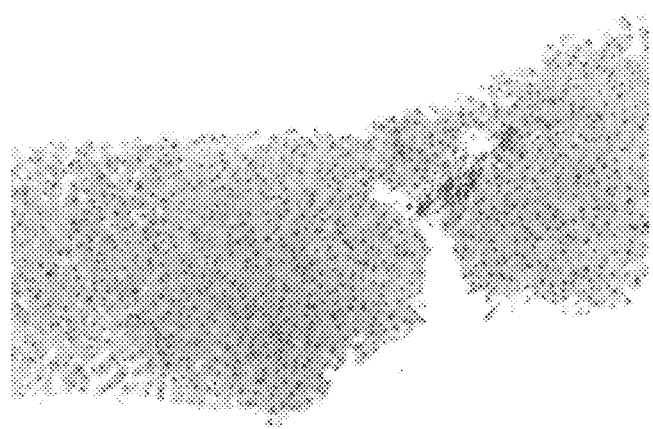

FIGS. 8A-8C are example cellularity images, respectively, of a tissue core, a magnified view of a tissue specimen processed according to one or more implementations herein, and a tissue specimen processed using conventional methods using formalin.

Figure 9A:
FIGS. 9A-9C are example cellularity images, respectively, of a tissue core, a magnified view of a tissue specimen processed according to one or more implementations herein, and a tissue specimen processed using conventional methods using formalin.
Figure 9B:
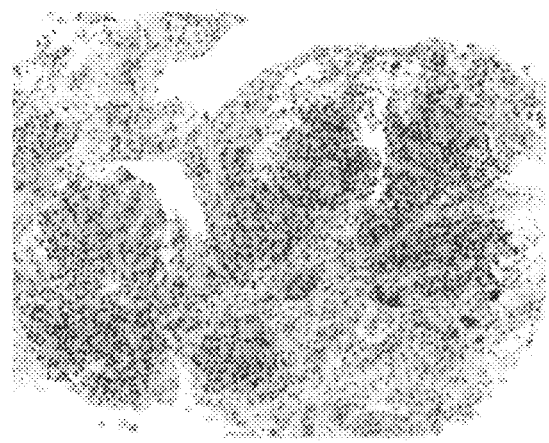
Figure 9C:
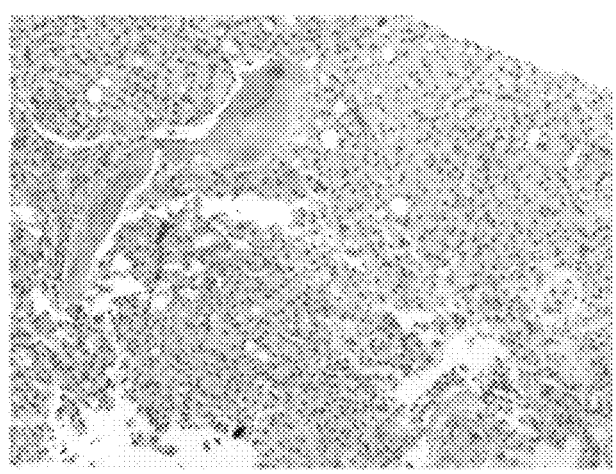

FIGS. 9A-9C are example cellularity images, respectively, of a tissue core, a magnified view of a tissue specimen processed according to one or more implementations herein, and a tissue specimen processed using conventional methods using formalin.

Figure 10A:
FIGS. 10A-10B are example cellularity images, respectively, of a tissue core and a magnified view of a tissue specimen processed according to one or more implementations herein.
Figure 10B:
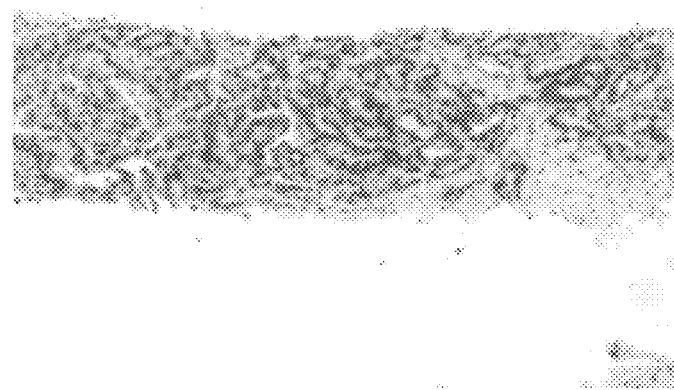

FIGS. 10A-10B are example cellularity images, respectively, of a tissue core and a magnified view of a tissue specimen processed according to one or more implementations herein.

Figure 11A:
FIGS. 11A-11B are example cellularity images, respectively, of a tissue core and a magnified view of a tissue specimen processed according to one or more implementations herein.
Figure 11B:
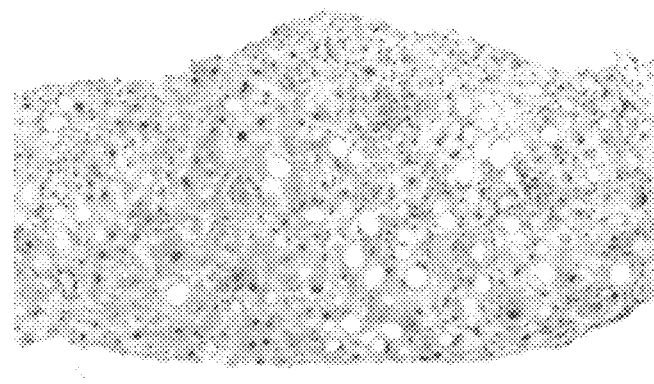

FIGS. 11A-11B are example cellularity images, respectively, of a tissue core and a magnified view of a tissue specimen processed according to one or more implementations herein.

FIGS. 12A-12F are an example comparison of immunohistochemical antibody-stained tissue specimens from FIGS. 7A-7C and FIGS. 10A-10B at different stages of processing, according to one or more implementations herein.

Figure 12A:
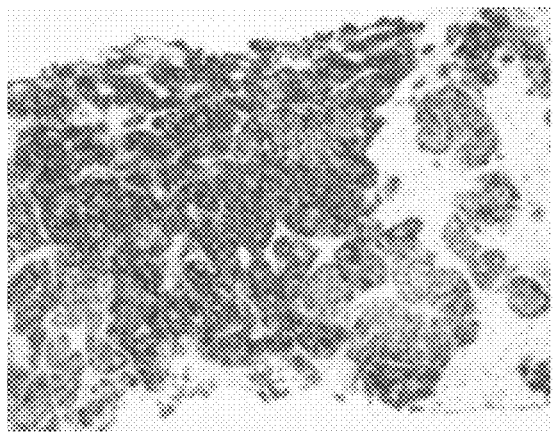
FIGS. 12A-12F are an example comparison of immunohistochemical antibody-stained tissue specimens from FIGS. 7A-7C and FIGS. 10A-10B at different stages of processing, according to one or more implementations herein.
Figure 12B:
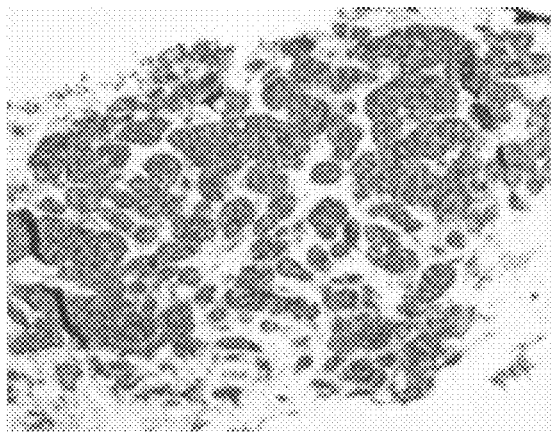
Figure 12C:
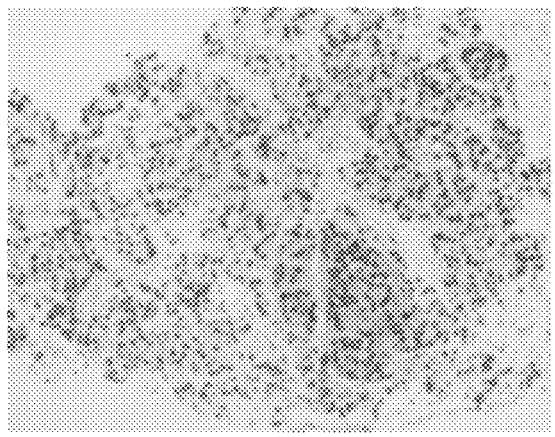
Figure 12D:
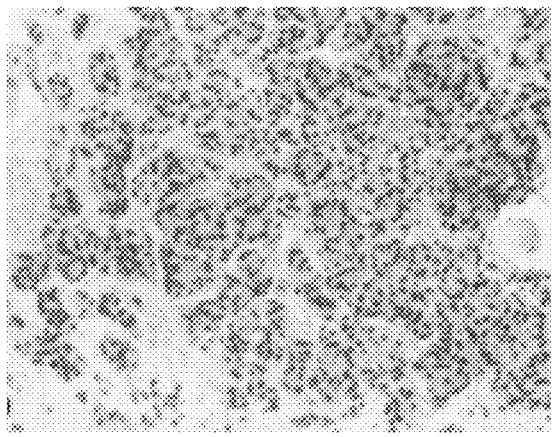
Figure 12E:
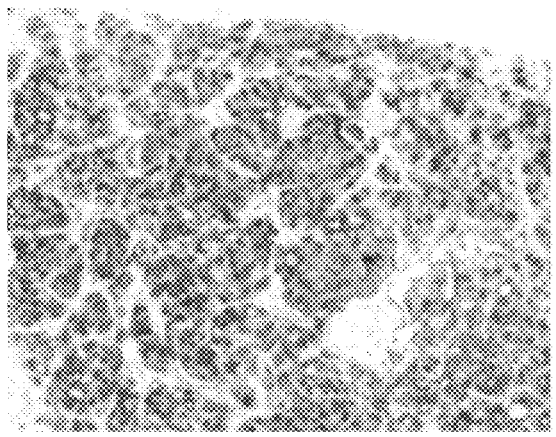
Figure 12F:
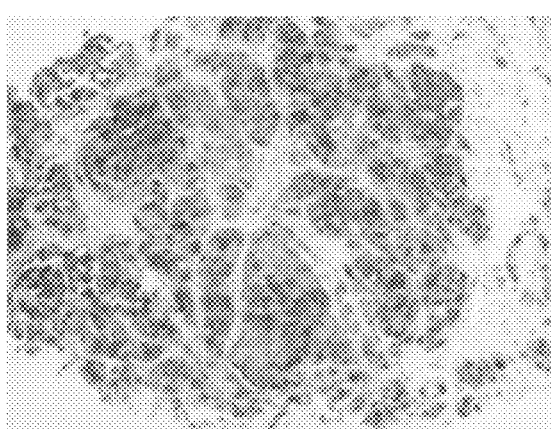

FIGS. 12A and 12B illustrate immunohistochemical staining results for antibodies to a membranous (e.g., CD-56) protein in the tissue core. FIGS. 12C and 12D illustrate immunohistochemical staining results for antibodies to a nuclear (e.g., NKX3.1) protein in the tissue core. FIGS. 12E and 12F illustrate immunohistochemical staining results for antibodies to a cytoplasmic (e.g., PSA) protein in the tissue core.

FIGS. 12A, 12C, and 12E have not completed processing (e.g., washing). FIGS. 12B, 12D, and 12F have completed processing (e.g., washing).

FIG. 13 illustrates pre-sequencing evaluative electropherogram assessment for degradation of the extracted DNA from a representative sample of washed/recovered dislodged cells demonstrating a bell shaped curve with minimal evidence of degradation, according to one or more implementations herein.

FIG. 14 illustrates post-sequencing qualitative data from all the washed specimens when assessed for Phred score, according to one or more implementations herein.

FIG. 15 illustrates post-sequencing qualitative data from all the washed specimens when assessed for per-base N content, according to one or more implementations herein.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions may be prefaced with letter or number references for convenience. However, use of such references does not imply a temporal or ordered relationship not otherwise required by the language of the claims. Unless the phrase 'means for' or 'step for' appears in a particular claim or claim limitation, such claim or claim limitation should not be interpreted to invoke 35 U.S.C. § 112(f).

As used herein, satisfying a threshold may, depending on the context, refer to a value being greater than the threshold, greater than or equal to the threshold, less than the threshold, less than or equal to the threshold, equal to the threshold, and/or the like, depending on the context.

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. A method for recovering an assessable analyte potentially including DNA, RNA, an exosome or a protein from a tissue sample retrieved via a core needle biopsy, the method comprising:
    obtaining the tissue sample via a core needle having the tissue sample disposed therein retrieved via the core needle biopsy, wherein the tissue sample comprises a tissue core and dislodged cells;
    providing a buffer solution, wherein the buffer solution does not comprise formalin;
    immersing a portion of the core needle having the tissue sample disposed therein in the buffer solution;
    swirling the core needle within the buffer solution to form a first intermediate mixture comprising the buffer solution, the tissue core, and the dislodged cells;
    filtering the first intermediate mixture into a sample tube using a strainer to separate the tissue core from the first intermediate mixture, yielding the tissue core and a second intermediate mixture comprising the buffer solution and the dislodged cells;
    adding a cell lysis and stabilization reagent not including formalin to the second intermediate mixture, yielding a third mixture comprising lysed dislodged cells from which the assessable analyte can be retrieved;
    extracting the assessable analyte from the third mixture; and
    assessing the assessable analyte;
    wherein the assessable analyte has not been exposed to formalin.

2. The method of claim 1, further comprising extracting the tissue core and disposing the tissue core within a container.

3. A method for recovering an assessable analyte potentially including DNA, RNA, an exosome or a protein from a tissue sample retrieved via a core needle biopsy, comprising:
    obtaining the tissue sample via a core needle having the tissue sample disposed therein retrieved via the core needle biopsy, wherein the tissue sample comprises a tissue core and dislodged cells;
    immersing a portion of the core needle having the tissue sample disposed therein in a buffer solution;
    swirling the core needle within the buffer solution to form a first intermediate mixture comprising the buffer solution, the tissue core, and the dislodged cells;
    filtering the first intermediate mixture using a strainer into a sample tube to separate the tissue core from the first intermediate mixture, yielding the tissue core and a second intermediate mixture comprising the buffer solution and the dislodged cells; and
    adding a cell lysis and stabilization reagent not including formalin to the second intermediate mixture yielding a third mixture comprising lysed dislodged cells from which the assessable analyte can be retrieved;
    wherein the assessable analyte has not been exposed to formalin.

4. The method of claim 3, wherein the cell lysis and stabilization reagent is equal in volume to the second intermediate mixture.

5. The method of claim 3, wherein the cell lysis and stabilization reagent comprises from 2 mL to 5 mL of the cell lysis and stabilization reagent.

6. The method of claim 3, further comprising storing the sample tube having the third mixture disposed therein within a freezer.

7. The method of claim 3, further comprising extracting the assessable analyte from the third mixture.

8. The method of claim 3, wherein the buffer solution comprises a phosphate buffered saline solution.

9. The method of claim 3, further comprising sterilizing the buffer solution prior to immersing the core needle therein.

10. The method of claim 3, wherein the assessable analyte is DNA, RNA, an exosome, or a protein.

11. The method of claim 1, wherein the buffer solution comprises a sterilized phosphate buffered saline solution.

12. The method of claim 1, wherein the cell lysis and stabilization reagent is equal in volume to the second intermediate mixture.

13. The method of claim 1, wherein the cell lysis and stabilization reagent comprises from 2 mL to 5 mL of the cell lysis and stabilization reagent.

14. The method of claim 1, wherein assessing the assessable analyte includes using a fluorometer.

15. The method of claim 1, wherein assessing the assessable analyte includes using a spectrophotometer.

16. The method of claim 1, wherein the assessable analyte is DNA, RNA, an exosome, or a protein.

* * * * *